(12) United States Patent
Park et al.

(10) Patent No.: US 12,547,889 B2
(45) Date of Patent: Feb. 10, 2026

(54) METHOD AND APPARATUS FOR SYNTHESIZING TARGET PRODUCTS BY USING NEURAL NETWORKS

(71) Applicant: SAMSUNG ELECTRONICS CO., LTD., Suwon-si (KR)

(72) Inventors: Minsik Park, Hwaseong-si (KR); Youngchun Kwon, Suwon-si (KR); Dongseon Lee, Yongin-si (KR); Younsuk Choi, Suwon-si (KR); Eunji Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1190 days.

(21) Appl. No.: 17/372,808

(22) Filed: Jul. 12, 2021

(65) Prior Publication Data

US 2022/0036182 A1 Feb. 3, 2022

(30) Foreign Application Priority Data

Jul. 29, 2020 (KR) .................. 10-2020-0094615
Feb. 8, 2021 (KR) .................. 10-2021-0017869

(51) Int. Cl.
*G06N 3/08* (2023.01)
*G06N 3/04* (2023.01)
(Continued)

(52) U.S. Cl.
CPC .............. *G06N 3/08* (2013.01); *G06N 3/04* (2013.01); *G16C 20/70* (2019.02); *G16C 20/10* (2019.02)

(58) Field of Classification Search
CPC .......... G16C 20/10; G16C 20/70; G06N 3/04; G06N 3/08; G06N 3/045; G06N 3/047; G06F 18/2415; G06F 18/2431
See application file for complete search history.

(56) References Cited

U.S. PATENT DOCUMENTS 7,216,113 B1 5/2007 Goldwasser et al.
8,715,574 B2 5/2014 Fritchie et al.
(Continued)

FOREIGN PATENT DOCUMENTS

JP 64-85131 A 3/1989
JP 7-53235 A 2/1995
(Continued)

OTHER PUBLICATIONS

Kraut, Hans, et al. "Algorithm for reaction classification." Journal of chemical information and modeling 53.11 (2013): 2884-2895. (Year: 2013).*
(Continued)

*Primary Examiner* — Karlheinz R. Skowronek
*Assistant Examiner* — Diana P Sanford
(74) *Attorney, Agent, or Firm* — Sughrue Mion, PLLC

(57) ABSTRACT

An apparatus for generating a target product by using a neural network is configured to: predict candidate reactant combinations for generating the target product by using a pre-trained retrosynthesis prediction model; predict a prediction product with respect to each of the candidate reactant combinations by using a pre-trained reaction prediction model; and determine an experimental priority order of the candidate reactant combinations based on a result of comparing the target product with the prediction product.

20 Claims, 9 Drawing Sheets

(51) Int. Cl.
G16C 20/10 (2019.01)
G16C 20/70 (2019.01)

(56) References Cited

U.S. PATENT DOCUMENTS

| | | | |
|---|---|---|---|
| 9,261,523 | B2 | 2/2016 | Fritchie et al. |
| 9,710,614 | B2 | 7/2017 | Ruzic et al. |
| 9,757,706 | B2 | 9/2017 | Cronin |
| 10,366,779 | B2 | 7/2019 | Hsu et al. |
| 2017/0121852 | A1 | 5/2017 | Siva Kimar et al. |
| 2019/0220573 | A1 | 7/2019 | Kwon et al. |
| 2021/0125060 | A1 | 4/2021 | Kwon et al. |
| 2021/0170597 | A1 | 6/2021 | Choi et al. |
| 2021/0180884 | A1 | 6/2021 | Hong et al. |

FOREIGN PATENT DOCUMENTS

| | | |
|---|---|---|
| JP | 2002-336685 A | 11/2002 |
| JP | 2004-339397 A | 12/2004 |
| KR | 10-2017-0049346 A | 5/2017 |
| WO | 2016/033965 A1 | 3/2016 |
| WO | 2019/055360 A1 | 3/2019 |
| WO | 2019/156872 A1 | 8/2019 |

OTHER PUBLICATIONS

Dai, Hanjun, et al. "Retrosynthesis prediction with conditional graph logic network." Advances in Neural Information Processing Systems 32 (2019). (Year: 2019).*
Van Den Oord, Aaron, and Oriol Vinyals. "Neural discrete representation learning." Advances in neural information processing systems 30 (2017). (Year: 2017).*
Ahneman et al. ,Predicting reaction performance in C—N cross-coupling using machine learning.Science360, 186-190(2018). DOI: 10.1126/science.aar5169 (Year: 2018).*
Schwaller, Philippe, et al. "Predicting retrosynthetic pathways using transformer-based models and a hyper-graph exploration strategy." Chemical science 11.12 (2020): 3316-3325. (Year: 2020).*
Guo, Zhongliang et al. "A Bayesian algorithm for retrosynthesis." arXiv Mar. 6, 2020 (Year: 2020).*
Communication dated Dec. 16, 2021 issued by the European Patent Office in application No. 21186592.8.
Kim, E., et al., "Valid, Plausible, and Diverse Retrosynthesis Using Tied Two-Way Transformers with Latent Variables" Journal of Chemical Information and Modeling, 2021, vol. 61, pp. 123-133, XP055869861.
Schwaller, P., et al., "Predicting retrosynthetic pathways using a combined linguistic model and hyper-graph exploration strategy", arXiv:1910.08036v1 [cs.LG], Oct. 17, 2019, pp. 1-26, XP081517132.
Johansson, S., et al., "AI-assisted synthesis prediction", Drug Discovery Today: Technologies, vol. 32, 2019, pp. 65-72, XP086429563.
Shi, C., et al., "A Graph to Graphs Framework for Retrosynthesis Prediction", arxiv.org, arXiv:2003.12725v1 [cs.LG], Mar. 28, 2020,10 pages, XP081632662.
Chen, B., et al. "Learning to Make Generalizable and Diverse Predictions for Retrosynthesis", arxiv.org, arXiv:1910.09688v1 [cs.LG], Oct. 21, 2019, pp. 1-11, XP081518776.
Eunji Kim et al., "Tied Two-way Transformers with Latent Modeling for Valid, Plausible, and Diverse Retrosynthesis", SAMSUNG Best Paper Award 2020, 6 pages.
Github, RDKit: Open-Source Cheminformatics Software, 2023, 2 pages, url: https://github.com/rdkit/rdkit.
Jimmy Lei Ba et al., "Layer Normalization", Jul. 21, 2016, 14 pages, arXiv:1607.06450v1 [stat.ML].
Anders Bøgevig et al., "Route Design in the 21st Century: The ICSYNTH Software Tool as an Idea Generator for Synthesis Prediction", Organic Process Research & Development, Jan. 22, 2015, vol. 19, No. 2, pp. 357-368, DOI: 10.1021/op500373e.
Clara D. Christ et al., "Mining Electronic Laboratory Notebooks: Analysis, Retrosynthesis, and Reaction Based Enumeration", Journal of Chemical Information and Modeling, Jun. 4, 2012, vol. 52, No. 7, pp. 1745-1756, DOI: 10.1021/ci300116p.
Connor W. Coley et al., "Prediction of Organic Reaction Outcomes Using Machine Learning", ACS Central Science, Apr. 18, 2017, vol. 3, No. 5, pp. 434-443, DOI: 10.1021/acscentsci.7b00064.
Connor W. Coley et al., "Computer-Assisted Retrosynthesis Based on Molecular Similarity", ACS Central Science, Nov. 16, 2017, vol. 3, No. 12, pp. 1237-1245, DOI: 10.1021/acscentsci.7b00355.
Anthony Cook et al., "Computer-aided synthesis design: 40 years on", WIREs Computational Molecular Science, 2012, vol. 2, pp. 79-107, DOI: 10.1002/wcms.61.
E. J. Corey et al., "Computer-Assisted Design of Complex Organic Syntheses", Science, Oct. 10, 1969, vol. 166, pp. 178-192, DOI: 10.1126/science.166.3902.178.
E. J. Corey et al., "General methods for the construction of complex molecules", Pure and Applied Chemistry, 1967, vol. 14, No. 1, pp. 19-38.
E. J. Corey et al., "Computer-Assisted Analysis in Organic Synthesis", Science, Apr. 26, 1985, vol. 228, No. 4698, pp. 408-418, DOI: 10.1126/science.3838594.
Hanjun Dai et al., "Retrosynthesis Prediction with Conditional Graph Logic Network", 33rd Conference on Neural Information Processing Systems (NeurIPS 2019), Jan. 6, 2020, 15 pages, arXiv:2001.01408v1 [cs.LG].
Markus Hartenfeller et al., "A Collection of Robust Organic Synthesis Reactions for In Silico Molecule Design", Journal of Chemical Information and Modeling, Nov. 11, 2011, vol. 51, No. 12, pp. 3093-3098, DOI: 10.1021/ci200379p.
Kaiming He et al., "Deep Residual Learning for Image Recognition", IEEE Conference on Computer Vision and Pattern Recognition (CVPR), 2016, pp. 770-778.
Wolf-Dietrich Ihlenfeldt et al., "Computer-Assisted Planning of Organic Syntheses: The Second Generation of Programs", Angewandte Chemie International Edition in English, 1995, vol. 34, pp. 2613-2633.
Pavel Karpov et al., "A Transformer Model for Retrosynthesis", Artificial Neural Networks and Machine Learning—ICANN 2019: Workshop and Special Sessions, 2019, vol. 11731, pp. 817-830, DOI: 10.1007/978-3-030-30493-5_78.
Diederik P. Kingma et al., "Adam: A Method for Stochastic Optimization", Published as a conference paper at the 3rd International Conference for Learning Representations (ICLR 2015), Jan. 30, 2017, 15 pages, arXiv:1412.6980v9 [cs.LG].
Mikołaj Kowalik et al., "Parallel Optimization of Synthetic Pathways within the Network of Organic Chemistry", Angewandte Chemie International Edition, 2012, vol. 51, pp. 7928-7932, DOI: 10.1002/anie.201202209.
James Law et al., "Route Designer: A Retrosynthetic Analysis Tool Utilizing Automated Retrosynthetic Rule Generation", Journal of Chemical Information and Modeling, 2009, vol. 49, No. 3, pp. 593-602, DOI: 10.1021/ci800228y.
Kangjie Lin et al., "Automatic retrosynthetic route planning using template-free models", Chemical Science, 2020, vol. 11, No. 12, pp. 3355-3364 , DOI: 10.1039/c9sc03666k.
Bowen Liu et al., "Retrosynthetic Reaction Prediction Using Neural Sequence-to-Sequence Models", ACS Central Science, 2017, vol. 3, No. 10, pp. 1103-1113, DOI: 10.1021/acscentsci.7b00303.
Łukasz Maziarka et al., "Molecule Attention Transformer", Feb. 19, 2020, 16 pages, arXiv:2002.08264v1 [cs.LG].
Robert Robinson, "LXIII.—A synthesis of tropinone", Journal of the Chemical Society, Transactions, 1917, vol. 111, pp. 762-768.
Hiroko Satoh et al., "SOPHIA, a Knowledge Base-Guided Reaction Prediction System—Utilization of a Knowledge Base Derived from a Reaction Database", Journal of Chemical Information and Computer Sciences, 1995, vol. 35, pp. 34-44, DOI: 10.1021/ci00023a005.
Nadine Schneider et al., "What's What: The (Nearly) Definitive Guide to Reaction Role Assignment", Journal of Chemical Information and Modeling, 2016, Vo. 56, No. 12, pp. 2336-2346, DOI: 10.1021/acs.jcim.6b00564.
Philippe Schwaller et al., ""Found in Translation": predicting outcomes of complex organic chemistry reactions using neural sequence-

(56) References Cited

OTHER PUBLICATIONS to-sequence models", Chemical Science, 2018, vol. 9, No. 28, pp. 6091-6098, DOI: 10.1039/C8SC02339E.

Philippe Schwaller et al., "Molecular Transformer: A Model for Uncertainty-Calibrated Chemical Reaction Prediction", ACS Central Science, 2019, vol. 5, No. 9, pp. 1572-1583, DOI: 10.1021/acscentsci.9b00576.

Marwin H. S. Segler et al., "Neural-Symbolic Machine Learning for Retrosynthesis and Reaction Prediction", Chemistry—A European Journal, 2017, vol. 23, No. 25, pp. 596-5971, DOI: 10.1002/chem.201605499.

Peter Shaw et al., "Self-Attention with Relative Position Representations", Apr. 12, 2018, 5 pages, arXiv:1803.02155v2 [cs.CL].

Sara Szymkuć et al., "Computer-Assisted Synthetic Planning: The End of the Beginning", Angewandte Chemie International Edition, 2016, vol. 55, No. 20, pp. 5904-5937, DOI: 10.1002/anie.201506101.

Matthew H. Todd et al., "Computer-aided organic synthesis", Chemical Society Reviews, 2005, vol. 34, No. 3, pp. 247-266, DOI: 10.1039/B104620A.

Ashish Vaswani et al., "Attention is All You Need", 31st Conference on Neural Information Processing Systems (NIPS 2017), 11 pages.

David Weininger, "SMILES, a chemical language and information system. 1. Introduction to methodology and encoding rules", Journal of Chemical Information and Computer Sciences, 1988, vol. 28, No. 1, pp. 31-36.

Yingce Xia et al., "Tied Transformers: Neural Machine Translation with Shared Encoder and Decoder", The Thirty-Third AAAI Conference on Artificial Intelligence (AAAI-19), 2019, pp. 5466-5473.

Shuangjia Zheng et al., "Predicting Retrosynthetic Reactions Using Self-Corrected Transformer Neural Networks", Journal of Chemical Information and Modeling, 2020, vol. 60, No. 1, pp. 47-55, Published Dec. 11, 2019, DOI: 10.1021/acs.jcim.9b00949.

Eunji Kim et al., "Supporting Information: Valid, Plausible, and Diverse Retrosynthesis Using Tied Two-Way Transformers with Latent Variables", 2021, 6 pages.

Juno Nam et al., "Linking the Neural Machine Translation and the Prediction of Organic Chemistry Reactions", Dec. 29, 2016, 19 pages, arXiv:1612.09529v1 [cs.LG].

Philippe Schwaller et al., "Predicting retrosynthetic pathways using transformer-based models and a hyper-graph exploration strategy", Chemical Science, 2020, vol. 11, No. 12, pp. 3316-3325, DOI: 10.1039/C9SC05704H.

A. P. Dempster et al., "Maximum Likelihood from Incomplete Data via the EM Algorithm", Journal of the Royal Statistical Society. Series B (Methodological), 1997, vol. 39, No. 1, 22 pages.

RELX—Information-based analytics and decision tools, 2023, 6 pages, https://www.relx.com/.

Mikolaj Sacha et al., "Molecule Edit Graph Attention Network: Modeling Chemical Reactions as Sequences of Graph Edits", May 25, 2021, 36 pages, arXiv:2006.15426v2 [cs.LG].

Vignesh Ram Somnath et al., "Learning Graph Models for Retrosynthesis Prediction", Jun. 4, 2021, 15 pages, arXiv:2006.07038v2 [cs.LG].

Indigo Toolkit, EPAM Systems, Life Sciences Open Source, 2023, 4 pages, https://lifescience.opensource.epam.com/indigo/.

Philippe Schwaller et al., "Unsupervised Attention-Guided Atom-Mapping", Version 1, ChemRxiv, May 14, 2020, 35 pages, DOI: 10.26434/chemrxiv.12298559.v1.

ASKCOS: Software tools for organic synthesis, version: Jan. 2021, 2023, 1 page, https://askcos.mit.edu.

Communication dated Sep. 30, 2025 issued by the Japan Office in Japanese Patent Application No. 2021-122539.

Communication dated Dec. 22, 2025, issued by the China National Intellectual Property Administration in Chinese Application No. 202110846347.8.

Van Den Oord et al., "Neural Discrete Representation Learning", 31st Conference on Neural Information Processing Systems, 2017, pp. 1-11 (11 pages total).

\* cited by examiner

METHOD AND APPARATUS FOR SYNTHESIZING TARGET PRODUCTS BY USING NEURAL NETWORKS

CROSS-REFERENCE TO RELATED APPLICATIONS

This application is based on and claims priority under 35 U.S.C. § 119 to Korean Patent Application Nos. 10-2020-0094615, filed on Jul. 29, 2020, and 10-2021-0017869, filed on Feb. 8, 2021, in the Korean Intellectual Property Office, the disclosures of which are incorporated by reference herein in their entirety.

BACKGROUND

1. Field

The disclosure relates to a method and an apparatus for synthesizing a target product by using a neural network.

2. Description of the Related Art

A neural network refers to a computational architecture modelling a biological brain. As neural network technologies have advanced, neural networks have been used by various fields and systems to analyze input data and extract valid information.

Recently, neural network technologies are being used for deriving valid and proper reactants and providing various candidate reactants.

SUMMARY

Provided are a method and an apparatus for synthesizing a target product by using a neural network. Technical objectives to be achieved by example embodiments are not limited to the technical tasks described above, and other technical aims may be derived from the embodiments described hereinafter.

Additional aspects will be set forth in part in the description which follows and, in part, will be apparent from the description, or may be learned by practice of the presented example embodiments of the disclosure.

According to an aspect of an embodiment, there is a method of synthesizing a target product using a neural network, the method including: predicting candidate reactant combinations for generating the target product based on a pre-trained retrosynthesis prediction model; predicting a prediction product with respect to each of the candidate reactant combinations based on a pre-trained reaction prediction model; and determining an experimental priority order of the candidate reactant combinations based on a result of comparing the target product with the prediction product.

The method further includes receiving test reactant combinations and test products corresponding to the test reactant combinations, and learning, using the pre-trained retrosynthesis prediction model and the pre-trained reaction prediction model, categorical latent variables including a plurality of classes based on the test reactant combinations and the test products.

The learning of the categorical latent variables includes learning a conditional probability distribution of the categorical latent variables corresponding to an input representing each of the test products.

The learning of the categorical latent variables includes learning the categorical latent variables based on a prediction yield rate provided by a pre-trained yield rate prediction model.

The predicting of the candidate reactant combinations and the predicting of the prediction product is based on the learned categorical latent variables.

The predicting of the candidate reactant combinations includes: receiving information corresponding to the target product; predicting categorical latent variables including a plurality of classes based on the information corresponding to the target product; and obtaining information corresponding to the candidate reactant combinations based on the information corresponding to the target product and the categorical latent variables.

The obtaining of the information corresponding to the candidate reactant combinations includes: calculating a likelihood for each of the classes of each of the candidate reactant combinations based on an input representing the target product; calculating a likelihood of an retrosynthesis prediction result corresponding to the input representing to the target product and an input representing the categorical latent variables; and selecting a predetermined number of final candidate reactant combinations based on the likelihood for each class and the likelihood of the retrosynthesis prediction result.

The predicting of the categorical latent variables includes providing an expectation reaction method for generating the target product as an input value of the categorical latent variables.

The predicting of the prediction product includes: receiving information corresponding to the candidate reactant combinations; receiving categorical latent variables including a plurality of classes; and obtaining information corresponding to the prediction product with respect to each of the candidate reactant combinations, based on the information corresponding to the candidate reactant combinations and the categorical latent variables.

The determining of the experimental priority order of the candidate reactant combinations includes: determining whether the prediction product and the target product correspond to each other, based on an input representing each of the candidate reactant combinations; and determining the experimental priority order of the candidate reactant combinations based on whether the prediction product and the target product correspond to each other.

In another embodiment, there is an apparatus including a neural network, the apparatus including: a memory storing at least one program; and a processor configured to execute the at least one program to: predict candidate reactant combinations for generating a target product based on a pre-trained retrosynthesis prediction model; predict a prediction product with respect to each of the candidate reactant combinations based on a pre-trained reaction prediction model; and determine an experimental priority order of the candidate reactant combinations based on a result of comparing the target product with the prediction product.

The processor is further configured to learn, using the pre-trained retrosynthesis prediction model and the pre-trained reaction prediction model, categorical latent variables including a plurality of classes based on test reactant combinations and test products corresponding to the test reactant combinations.

The pre-trained retrosynthesis prediction model and the pre-trained reaction prediction model learn a conditional probability distribution of the categorical latent variables with respect to an input representing each of the test products.

The pre-trained retrosynthesis prediction model and the pre-trained reaction prediction model learn the categorical latent variables based on a prediction yield rate provided by a pre-trained yield rate prediction model.

The processor is further configured to predict the candidate reactant combinations and the predicting of the prediction product is based on the learned categorical latent variables.

The processor is further configured to execute the at least one program to: receive information corresponding to the target product; predict categorical latent variables including a plurality of classes based on the information corresponding to the target product; and obtain information corresponding to the candidate reactant combinations based on the information corresponding to the target product and the categorical latent variables.

The processor is further configured to execute the at least one program to: calculate a likelihood for each of the classes of each of the candidate reactant combinations based on an input representing the target product; calculate a likelihood of an retrosynthesis prediction result with respect to the input representing the target product and an input representing the categorical latent variables; and select a predetermined number of final candidate reactant combinations based on the likelihood for each class and the likelihood of the retrosynthesis prediction result.

An expectation reaction method for generating the target product is provided as an input value of the categorical latent variables.

The processor is further configured to execute the at least one program to: receive information corresponding to the candidate reactant combinations; receive categorical latent variables including a plurality of classes; and obtain information corresponding to the prediction product corresponding to each of the candidate reactant combinations, based on the information corresponding to the candidate reactant combinations and the categorical latent variables.

The processor is further configured to execute the at least one program to: determine whether the prediction product and the target product correspond to each other, based on an input representing each of the candidate reactant combinations; and determine the experimental priority order of the candidate reactant combinations based on whether the prediction product and the target product correspond to each other.

In yet another embodiment, there is an apparatus including: a memory storing at least one program; and a processor configured to execute the at least one program to: predicting, based on a pre-trained retrosynthesis prediction model, candidate reactant combinations for a target product; predicting, based on a pre-trained reaction prediction model, a prediction product corresponding to each of the candidate reactant combinations; identifying one or more categorical latent variables including a plurality of classes based on the candidate reactant combinations and the prediction product; and determining an experimental priority order of the candidate reactant combinations based on the one or more categorical latent variables.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
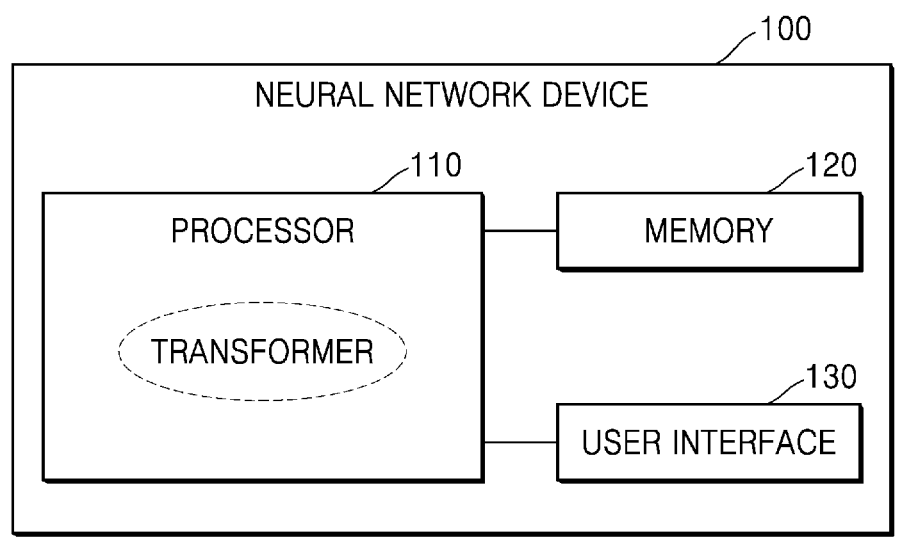
FIG. 1 is a block diagram of hardware components of a neural network device according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The expressions such as "in some example embodiments," "according to an example embodiment," and the like, described in various parts of this specification do not necessarily refer to the same element as one another.

One or more example embodiments of the disclosure may be described as functional block components and various processing operations. All or part of such functional blocks may be realized by any number of hardware and/or software components configured to perform the specified functions. For example, the functional blocks of the disclosure may be implemented with one or more micro-processors or with circuit structures for certain functions. Also, for example, the functional blocks of the disclosure may be implemented with various programming or scripting languages. The functional blocks may be implemented with algorithms executed by one or more processors. Furthermore, the disclosure could employ conventional techniques for electronics configuration, signal processing and/or data control. The terms, such as "mechanism," "element," "component," etc., are not limited to mechanical and physical components.

Furthermore, the connecting lines, or connectors shown in the drawings are intended to represent example functional relationships and/or physical or logical couplings between the various elements. It should be noted that many alternative or additional functional relationships, physical connections or logical connections may be present in a practical device.

Regarding the terms used in this specification, a structure, which is data used in a neural network system, may represent a structure of an atom level of a material. The structure may be a structural formula based on a bond between an atom and an atom. For example, the structure may be a string type (one dimensional) having a simple format. String types indicating a structure include a simplified molecular-input line-entry system (SMILES) code, a smiles arbitrary target specification (SMARTS) code, an international chemical identifier (InChi) code, etc.

Also, a descriptor is an index value used to indicate characteristics of a material and may be obtained by performing a relatively simple calculation process on a given material. For example, in an embodiment, the descriptor may include: a descriptor of a molecular structure fingerprint (for example, a Morgan fingerprint or an extended connectivity fingerprint (ECFP)) indicating whether or not a particular partial structure is included; or a descriptor of a quantitative structure-property relationships (QSPR) formed of values that may be directly calculated, such as a molecular weight or the number of partial structures (for example, rings) included in a molecular structure.

Also, a property may denote characteristics possessed or expressed by a material and may correspond to a value of a real number, measured by an experiment or calculated by a simulation. For example, when a material is a display material, the property may denote a transmission wavelength, an emission wavelength, etc. of light, and when a material is a battery material, the property may denote a voltage. Unlike the descriptor, a complex simulation and/or an abundant amount of time may be required to calculate the property.

FIG. 1 is a block diagram of hardware components of a neural network device 100 according to an example embodiment.

The neural network device 100 may be realized as various types of devices, such as a personal computer (PC), a server device, a mobile device, an embedded device, etc. Specifically, the neural network device 100 may correspond to a smartphone, a tablet device, an augmented reality (AR) device, an Internet of things (IoT) device, an autonomous vehicle, a robotics device, a medical device, etc. that perform voice recognition, image recognition, image classification, etc. using a neural network, but is not limited thereto. In addition, the neural network device 100 may correspond to an exclusive hardware (HW) accelerator mounted in the devices as described above. For example, the neural network device 100 may correspond to the HW accelerator, such as a neural processing unit (NPU), a tensor processing unit (TPU), a neural engine, etc. that are exclusive modules for driving a neural network. However, the neural network device 100 is not limited to any one or more of these examples, and as such, according to other example embodiments, the neural network device 100 may be implemented by other electronic devices.

Referring to FIG. 1, the neural network device 100 may include a processor 110, a memory 120, and a user interface 130. FIG. 1 illustrates only components of the neural network device 100 that are related to the embodiments. Thus, it is obvious to one of ordinary skill in the art that the neural network device 100 may further include other components other than the components illustrated in FIG. 1. According to an example embodiment, the other components may be general purpose components.

The processor 110 may control general functions for the execution of the neural network device 100. For example, the processor 110 may execute programs stored in the memory 120 of the neural network device 100, to generally control the neural network device 100. According to an embodiment, the processor 110 may execute programs stored in the memory 120 of the neural network device 100, to control one or more operations of the neural network device 100. The processor 110 may be realized as a central processing unit (CPU), a graphics processing unit (GPU), an application processor (AP), etc. provided in the neural network device 100. However, the disclosure is not limited thereto, and as such, according to other example embodiments, the processor 110 may be implemented by other circuitry.

The memory 120 may be a HW component storing various data processed in the neural network device 100. For example, the memory 120 may store data, which is processed and to be processed in the neural network device 100. Also, the memory 120 may store applications, drivers, etc. to be driven by the neural network device 100. The memory 120 may include a random-access memory (RAM), such as a dynamic RAM (DRAM), a static RAM (SRAM), etc., a read-only memory (ROM), an electrically-erasable programmable ROM (EEPROM), a CD-ROM, a Blueray or other optical disk storages, a hard disk drive (HDD), a solid state drive (SSD), or a flash memory. However, the disclosure is not limited thereto, and as such, according to other example embodiments, the memory 120 may be implemented by other circuitry.

The processor 110 may drive at least one of an retrosynthesis prediction model, a synthesis prediction model, a yield rate prediction model, and a reaction method model.

The retrosynthesis prediction model, the synthesis prediction model, the yield rate prediction model, and the reaction method model may be realized as transformer models. When the neural network device 100 drives a transformer model, parallel processing of data and rapid calculation may be possible.

According to an example embodiment, the processor 110 may train the transformer model by using a test data set, and during the training process, categorical latent variables may be determined or learned. For example, the processor 110 may learn a conditional probability distribution of the categorical latent variables with respect to an input of each of test products. Also, a prediction yield rate and a reaction method may be provided to teach the conditional probability distribution of the categorical latent variables.

The test data set may include test reactants and test products corresponding to test reactants combinations, respectively. Also, the test data set may further include a prediction yield rate of the test products based on an experimental condition and a reaction method of each of the test reactant combinations.

The experimental condition may denote various conditions configured for executing an experiment for generating a product by using a reactant. For example, the experimental condition may include at least one of a catalyst, a base, a solvent, a reagent, a temperature, and a reaction time.

The prediction yield rate may denote an expected value with respect to a yield rate of a product generated from a reactant, when the reactant is experimented under a predetermined reaction method and a predetermined experimental condition. The prediction yield rate may be different from an actual yield rate according to an actual experiment.

The reaction method may denote a chemical reaction equation for generating a product by using a reactant. For example, when a product, which is halide (R2-BY2), is generated by using a reactant, which is organoboron (R1-BY2), the reaction method may correspond to a Suzuki-Miyaura method. The reaction method may be provided in a plural number, according to structural information of a reactant and structural information of a product.

The processor 110 may predict candidate reactant combinations for generating a target product by using a pre-trained retrosynthesis prediction model.

The processor 110 may receive a chemical structure of the target product as a string type (one dimensional). The structure may be a structural formula based on a bond between an atom and an atom. For example, the processor 110 may receive the chemical structure of the target product, as a SMILES code, a SMARTS code, or an InChi code. According to an example embodiment, information with respect to a descriptor of the target product and information about a property of the target product may be input as string types together with the chemical structure. Although the chemical structure is represented as a string type, the disclosure is not limited thereto, and as such, according to another example embodiment, the structure may be denoted by a vector representation or a graph-based representation.

According to an example embodiment, the processor 110 may perform calculations by executing the pre-trained retrosynthesis prediction model and using, as input data, strings of the target product. Moreover, based on results of the calculations, the processor 110 may generate, as output data of a string type, the candidate reactant combinations.

According to an example embodiment, the processor 110 may predict a prediction product with respect to each of the candidate reactant combinations by using a pre-trained reaction prediction model.

According to an example embodiment, the processor 110 may perform calculations by executing the pre-trained reaction prediction model, using, as input data, the candidate reactant combinations. Moreover, based on results of the calculations, the processor 110 may generate, as output data of a string type, the prediction products.

According to an example embodiment, the processor 110 may perform calculations by driving a pre-trained yield rate prediction model using, as input data, the candidate reactant combinations. Moreover, based on results of the calculations, the processor 110 may generate, as output data, a prediction yield rate of the target product and a reaction method for generating the target product. The prediction yield rate of the target product may be used as data for learning the categorical latent variables.

According to an example embodiment, the processor 110 may perform calculations by driving a pre-trained reaction method prediction model using, as input data, the target product. Moreover, based on results of the calculations, the processor 110 may generate, as output data, the reaction method for generating the target product. The reaction method for generating the target product may be used as data for learning the categorical latent variables.

The processor 110 may compare the target product with the prediction products and, based on results of the comparisons, may determine an experimental priority order of the candidate reactant combinations. Accordingly, optimum candidate reactant combinations for generating the target product may be output according to a priority order.

The user interface 130 may denote an input device for receiving feedback with respect to an experimental result. For example, the user interface 130 may include a key pad, a dome switch, a touch pad (a touch capacitance method, a pressure resistive-layer method, an infrared sensing method, a surface ultrasonic conduction method, an integral tension measurement method, a piezo effect method, etc.), a jog wheel, a jog switch, etc., but is not limited thereto. The processor 110 may update the transformer model by receiving the feedback with respect to the experimental result.

Hereinafter, methods of preferentially providing an optimized experimental condition by using the neural network device 100 as above will be described in detail, according to example embodiments. The methods described hereinafter may be performed by the processor 110, the memory 120, and the user interface 130 of the neural network device 100.

Figure 2:
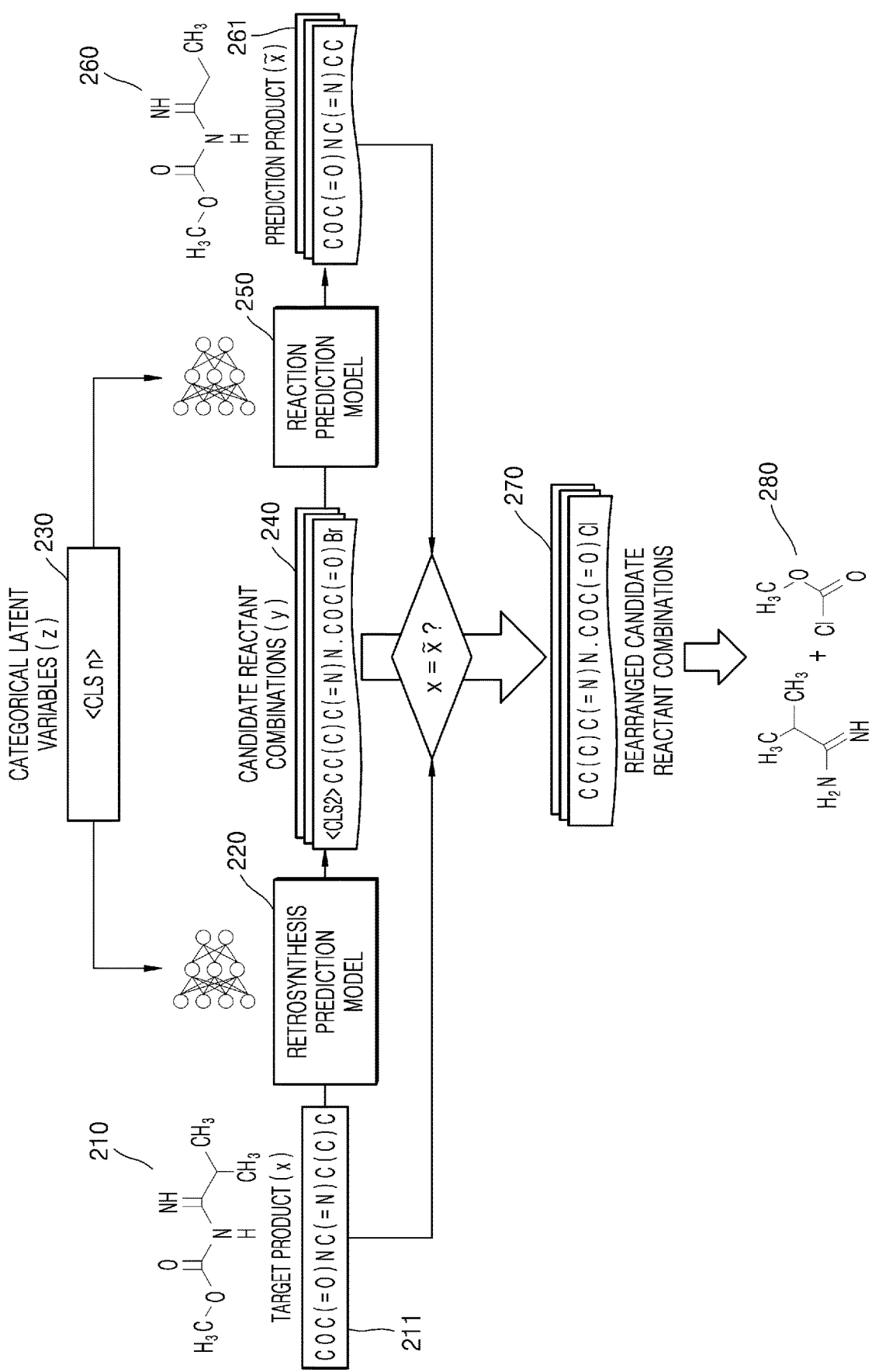
FIG. 2 is a diagram for describing a process in which an experimental priority order of candidate reactant combinations is determined based on a result of a comparison between a target product and a prediction product, according to an example embodiment.
Figure 3:
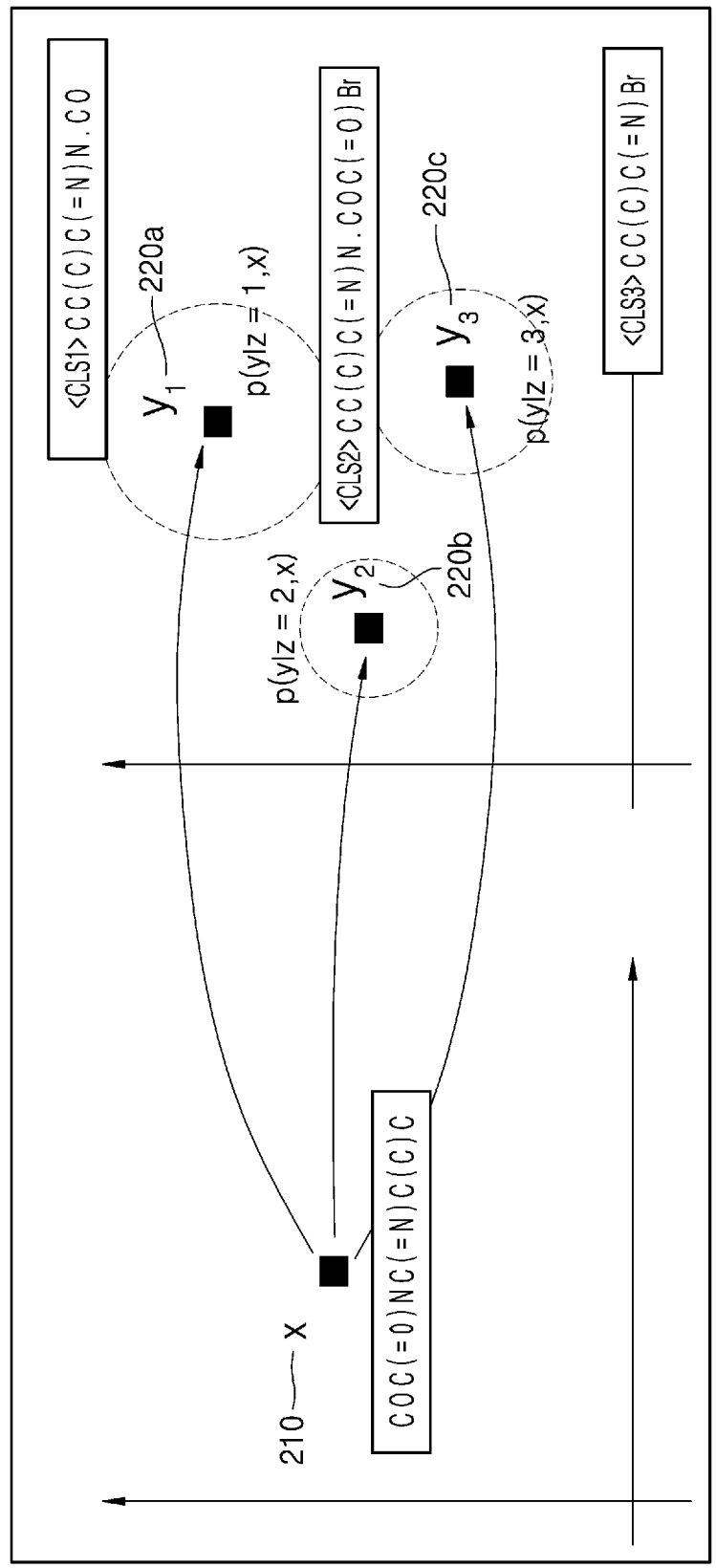
FIG. 3 is a diagram for describing categorical latent variables.

FIG. 2 illustrates a diagram for describing a process in which an experimental priority order of candidate reactant combinations is determined based on a result of comparing a target product with a prediction product, according to an example embodiment, and FIG. 3 is a diagram for describing categorical latent variables.

Referring to FIG. 2, the processor 110 may receive a chemical structure of a target product 210 as a string type.

The string type representation 211 of the target product 210 may be input into an retrosynthesis prediction model 220. Also, categorical latent variables 230 may be input into the retrosynthesis prediction model 220.

The categorical latent variables 230 may denote variables that are not directly observed but affect information with respect to candidate reactant combinations 240. According to an example embodiment, the categorical latent variables 230 may indicate types of reaction. The types of reaction may indicate, for example, the reaction types, such as decomposition, combustion, metathesis, and displacement, the experimental conditions, such as a catalyst, a base, a solvent, a reagent, a temperature, and a reaction time, and the reaction methods, such as Suzuki-Miyaura. However, the disclosure is not limited to thereto, and as such, according to other example embodiment, the reaction types may include other reaction types, the experimental conditions may include other experimental conditions, and the reaction methods may include other reaction methods.

The categorical latent variables 230 may include a plurality of classes. The plurality of classes may be generated correspondingly to the types of reaction. A cluster of candidate reactants or candidate reactant combinations may be changed according to the categorical latent variables.

According to an example embodiment, an retrosynthesis prediction model may be a probability model depending on the categorical latent variables that are not observed. According to an example embodiment, the retrosynthesis prediction model may be a Gaussian combination model composed of a plurality of normal distributions in which information with respect to the candidate reactants or the candidate reactant combinations have different parameters (for example, expected values, variance etc.) according to the categorical latent variables, but is not limited thereto.

The processor 110 may output the candidate reactant combinations 240 for generating the target product 210, by using the pre-trained retrosynthesis prediction model 220. The candidate reactant combinations 240 may be output as a string type. In other words, the processor 110 may output the candidate reactant combinations 240 of the string type representation 211 based on the target product 210 and the categorical latent variables 230. According to an example embodiment, the processor 110 may output the candidate reactant combinations 240 maximizing both of a likelihood for each class with respect to an input of the target product 210 and a likelihood of an retrosynthesis prediction result, but is not limited thereto.

The candidate reactant combinations 240 may denote a set of reactant combinations predicted by the processor 110 for generating the target product 210. The candidate reactant combination may include a plurality of candidate reactants, but are not limited thereto. In other words, the candidate reactant combination may include only one candidate reactant.

According to an example embodiment, because the categorical latent variables 230 may be input into the retrosynthesis prediction model 220, a variety of the candidate reactant combinations 240 may be obtained as illustrated in FIG. 3.

Referring to FIG. 3, when the processor 110 sets any one of the classes included in the categorical latent variables 230 as an initial token and performs decoding based on the set initial token, a plurality of candidate reactant combinations 220a, 220b, and 220c may be generated with respect to one target product 210. The candidate reactant combinations 220a, 220b, and 220c may be clustered according to a conditional probability for each class of the candidate reactant combinations 220a, 220b, and 220c based on an input of the target product 210. FIG. 3 illustrates a clustering process of the candidate reactant combinations 220a, 220b, and 220c based on an input of the target product 210, when there are three classes.

The processor 110 may calculate a likelihood for each class of each of the candidate reactant combinations 240 based on the input of the target product 210. Also, the processor 110 may select a number of final candidate reactant combinations from the candidate reactant combinations 240 based on the likelihood for each class of each of the candidate reactant combinations 240. According to an example embodiment, the number of final candidate reactant combinations selected by the processor 110 may be predetermined. According to an example embodiment, the processor 110 may calculate a log likelihood for each class of each of the candidate reactant combinations 240 and may select the predetermined number of final candidate reactant combinations based on the log likelihood for each class. The final candidate reactant combinations may be input into a reaction prediction model 250 in FIG. 2 and may be used to predict a prediction product 260 in FIG. 2.

Referring to FIG. 2, the candidate reactant combinations 240 may be input into the reaction prediction model 250. Also, according to an example embodiment, all of the same categorical latent variables 230 may also be input into the reaction prediction model 250. In another embodiment, one or more of the categorical latent variables 230 input into the retrosynthesis prediction model 220 are not input into the reaction prediction model 250. In another embodiment, one or more of the categorical latent variables input into the reaction prediction model 250 were not input not the retrosynthesis prediction model 220.

The processor 110 may output the prediction product 260 with respect to each of the candidate reactant combinations 240, by using the pre-trained reaction prediction model 250. The prediction product 260 may be output as a string type. In other words, the processor 110 may output a prediction product 261 of a string type based on the candidate reactant combinations 240 of the string type and the categorical latent variables 230. In an embodiment, the processor 110 may output the prediction product 260 maximizing both of a likelihood for each class with respect to an input of the candidate reactant combinations 240 and a likelihood of a reaction prediction result, but is not limited thereto.

The prediction product 260 may refer to a product predicted based on reactants included in the candidate reactant combinations 240.

The categorical latent variables 230 may be input into the reaction prediction model 250, and thus, the diversity of the prediction product 260 may also be obtained.

The processor 110 may compare the prediction product 260 based on the input of each of the candidate reactant combinations 240, with the target product 210. Also, the processor 110 may determine an experimental priority order of the candidate reactant combinations 240 based on a result of the comparison between the prediction product 260 and the target product 210. According to an example embodiment, the processor 110 may compare the string type representation 211 of the target product 210 with the string type representation 261 of the prediction product 260 and may determine an experimental priority order of the candidate reactant combinations 240 based on a result of the comparison.

The processor 110 may output rearranged candidate reactant combinations 270, for which the experimental priority order is adjusted. The processor 110 may output the rearranged candidate reactant combinations 270 of a formula type and/or a string type. The processor 110 may output the rearranged candidate reactant combinations 270 of a formula type (e.g., structural formula 280) and/or a string type 270 to a predetermined display device.

The neural network device 100 according to the disclosure may verify, through the reaction prediction model 250, the candidate reactant combinations 240 derived through the retrosynthesis prediction model 220, and thus, both of a case in which the candidate reactant combinations 240 inconsistent with the formula grammar are output and a case in which the target product 210 may not be synthesized as a string type may be prevented.

Figure 4:
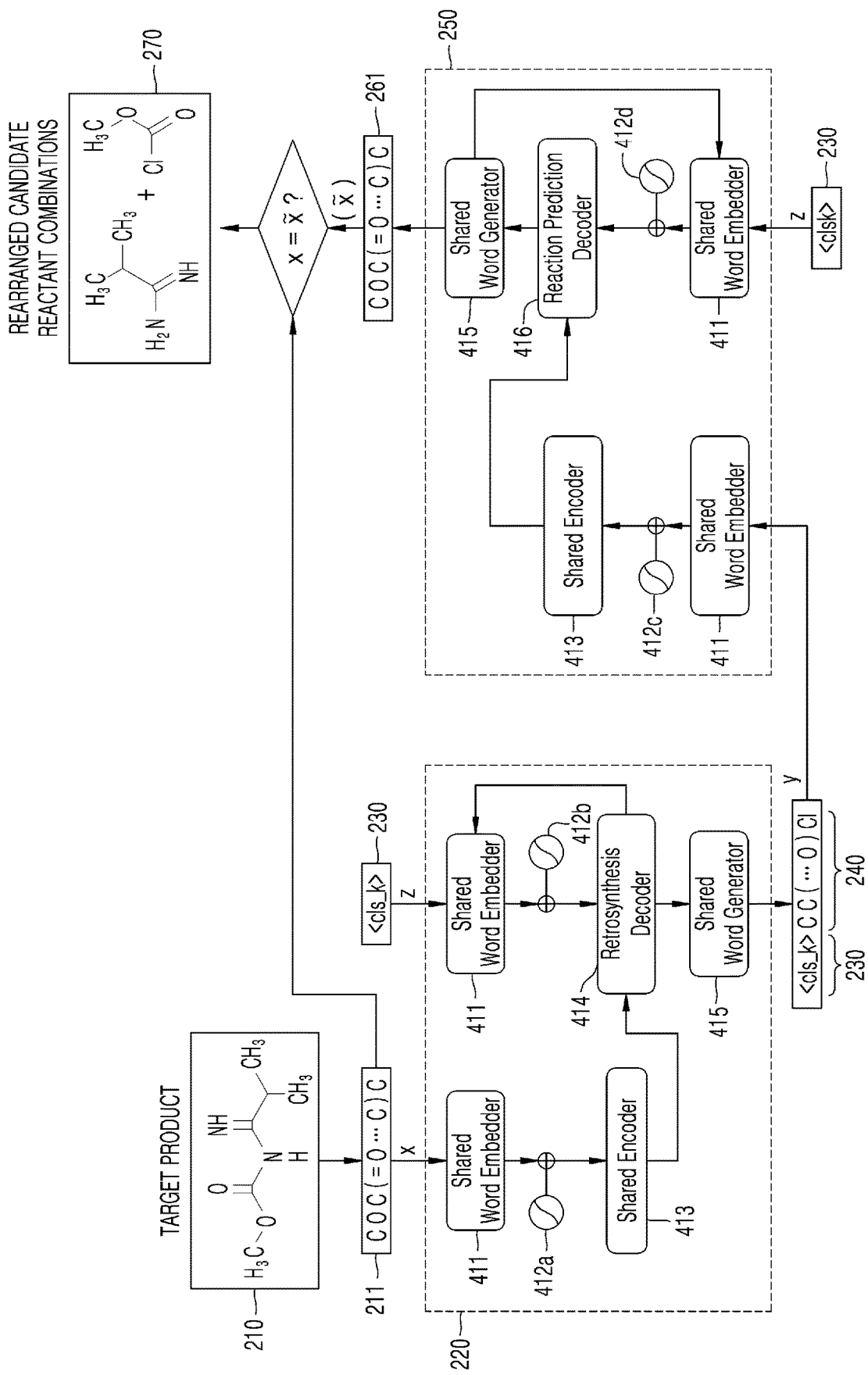
FIG. 4 is a diagram for describing a calculation performed in an retrosynthesis prediction model and a reaction prediction model, according to an example embodiment.

FIG. 4 is a diagram for describing a calculation performed in an retrosynthesis prediction model and a reaction prediction model, according to an example embodiment.

Referring to FIG. 4, the processor 110 may receive information with respect to the target product 210. The information with respect to the target product 210 may be indicated as a string type representation 211. The string type representation 211 of the target product 210 may be input into the retrosynthesis prediction model 220.

The processor 110 may predict the categorical latent variables 230 based on the information with respect to the target product 210. The categorical latent variables 230 may denote variables that are not directly observed but affect information with respect to the candidate reactant combinations 240 and may include a plurality of classes.

According to an example embodiment, by driving the retrosynthesis prediction model 220 based on the information with respect to the target product 210 and the categorical latent variables 230, the processor 110 may predict the candidate reactant combinations 240 for generating the target product 210.

The retrosynthesis prediction model 220 may include a word embedder 411, first through fourth position encoders 412a, 412b, 412c, and 412d (hereinafter, indicated as a position encoder 412 when there is no need of distinction), an retrosynthesis encoder 413, an retrosynthesis decoder 414, and a word generator 415. In FIG. 4, each of the word embedder 411, the position encoder 412, the retrosynthesis encoder 413, the retrosynthesis decoder 414, and the word generator 415 are illustrated as one unit included in the retrosynthesis prediction model 220. However, the word embedder 411, the position encoder 412, the retrosynthesis encoder 413, the retrosynthesis decoder 414, and the word generator 415 may denote a layer included in the retrosynthesis prediction model 220.

The word embedder 411 may embed input data in units of letters. The word embedder 411 may map the string type representation 211 of the target product 210 to a vector. According to an example embodiment, the word embedder 411 may map the string type representation 211 of the target product 210 to a vector of a predetermined dimension. Also, the word embedder 411 may map the categorical latent variables 230 to a vector. According to an example embodiment, the word embedder 411 may map the categorical latent variables 230 to a vector of a predetermined dimension.

The position encoder 412 may perform positional encoding to identify a position of each of letters included in the input data. According to an example embodiment, the position encoder 412 may encode input data by using sine waves having different frequencies.

The first position encoder 412a may perform positional encoding on the string type representation 211 of the target product 210. The first position encoder 412a may combine position information to the embedded input data and provide the combined data to the retrosynthesis encoder 413.

The second position encoder 412b may perform positional encoding by setting the categorical latent variables 230 as an initial token. The second position encoder 412b may combine position information to the embedded input data and provide the combined data to the retrosynthesis encoder 413.

The retrosynthesis encoder 413 may include a self-attention sub-layer and a feed-forward sub-layer. For convenience of explanation, FIG. 4 illustrates one retrosynthesis encoder 413. However, the retrosynthesis encoder 413 may include N encoders that are stacked.

The retrosynthesis encoder 413 may specify information for attention from an input sequence of the target product 210 through the self-attention sub-layer. The specified information may be transmitted to the feed-forward sub-layer. The feed-forward sub-layer may include a feed-forward neural network and a transform sequence of the input sequence may be output through the feed-forward neural network. The transform sequence may be provided to the retrosynthesis decoder 414 as an encoder output of the retrosynthesis encoder 413.

For convenience of explanation, FIG. 4 illustrates one retrosynthesis decoder 414. However, the retrosynthesis decoder 414 may include N decoders that are stacked.

The retrosynthesis decoder 414 may include a self-attention sub-layer, an encoder-decoder attention sub-layer, and a feed-forward sub-layer. The encoder-decoder attention sub-layer may be different from the self-attention sub-layer in that, in the encoder-decoder attention sub-layer, a query is a vector of a decoder and a key and a value are vectors of an encoder.

According to an example embodiment, a residual connection sub-layer and a normalization sub-layer may be separately applied to all subordinate layers, and masking may be applied to the self-attention sub-layer so that a current output position is not used as information with respect to a next output position. Also, a decoder output may be linearly transformed or a softmax function may be applied to the decoder output.

The retrosynthesis decoder 414 may output output sequences corresponding to an input sequence of the categorical latent variables 230 and an input sequence of the target product 210, by using a beam search procedure. The output sequences may be transformed by the word generator 415 as a string type and may be output. Thus, the retrosynthesis prediction model 220 may output the candidate reactor combinations 240 of the string type corresponding to the input of the target product 210. Also, the categorical latent variables 230 may be shared by the reaction prediction model 250 to be used for a calculation of the prediction product.

According to an example embodiment, by driving the reaction prediction model 250 based on the information with respect to the candidate reactor combinations 240 and the categorical latent variables 230, the processor 110 may predict the prediction target 260 with respect to each of the candidate reactor combinations 240.

The reaction prediction model 250 may include a word embedder 411, a position encoder 412, a reaction prediction encoder 413, a reaction prediction decoder 416, and a word generator 415. As described below, the retrosynthesis prediction model 220 and the reaction prediction model 250 may share the encoders, and thus, the retrosynthesis encoder 413 and the reaction prediction encoder 413 may be referred to as the shared encoder 413. Also, in FIG. 4, each of the word embedder 411, the position encoder 412, the reaction prediction encoder 413, the reaction prediction decoder 416, and the word generator 415 are illustrated as one unit included in the reaction prediction model 250. However, the word embedder 411, the position encoder 412, the reaction prediction encoder 413, the reaction prediction decoder 416, and the word generator 415 may denote a layer included in the reaction prediction model 250.

A calculation method of the reaction prediction model 250 and a calculation method of the retrosynthesis prediction model 220 may be substantially the same as each other, except for a type of input sequence and a type of output sequence. In other words, the word embedder 411 may receive the candidate reactant combinations 240 and the categorical latent variables 230 as input data and may embed the input data in units of letters. Also, the third position encoder 412c may combine position information to the embedded input data and provide the combined data to the reaction prediction encoder 413, and the fourth position encoder 412d may perform positional encoding by setting the categorical latent variables 230 as in an initial token and provide the categorical latent variables 230 on which the positional encoding is performed to the reaction prediction encoder 413.

The reaction prediction encoder 413 may specify information to give attention from an input sequence of the candidate reactant combinations 240 through a self-attention sub-layer and provide the specified information to a feed-forward sub-layer, and the feed-forward sub-layer may output a transform sequence by using a feed-forward neural network.

The reaction prediction decoder 416 may include a self-attention sub-layer, an encoder-decoder attention sub-layer, and a feed-forward sub-layer. Also, a residual connection sub-layer and a normalization sub-layer may be separately applied to all of subordinate layers, and masking may be applied to the self-attention sub-layer lest a current output position is used as information with respect to a next output position. Also, a decoder output may be linearly transformed or a softmax function may be applied to the decoder output.

The reaction prediction decoder 416 may output output sequences corresponding to an input sequence of the categorical latent variables 230 and an input sequence of the candidate reactant combinations 240 by using a beam search procedure. The output sequences may be transformed by the word generator 415 as a string type and may be output. Thus, the reaction prediction model 250 may output the prediction product 261 of the string type corresponding to the input of the candidate reactant combinations 240.

The processor 110 may compare the string type representation 211 of the target product 210 with the string type representation 261 of the prediction product 260 and may determine an experimental priority order of the candidate reactant combinations 240 based on a result of the comparison. The processor 110 may determine the experimental priority order of the candidate reactant combinations 240 based on whether or not the string type representation 211 of the target product 210 and the string type representation 261 of the prediction product 260 correspond to each other and may output the candidate reactant combinations 270 rearranged based on the determined experimental priority order.

In FIG. 4, a source language and a target language are the same as each other as the string types (for example, SMILES), and thus, the retrosynthesis prediction model 220 and the reaction prediction model 250 may share the word embedder 411, the word generator 415, and the encoders. Also, the retrosynthesis prediction model 220 and the reaction prediction model 250 may share the parameters, such as the categorical latent variables 230, and thus, the model complexity may be reduced, and the regularization of the models may become easy.

Figure 5:
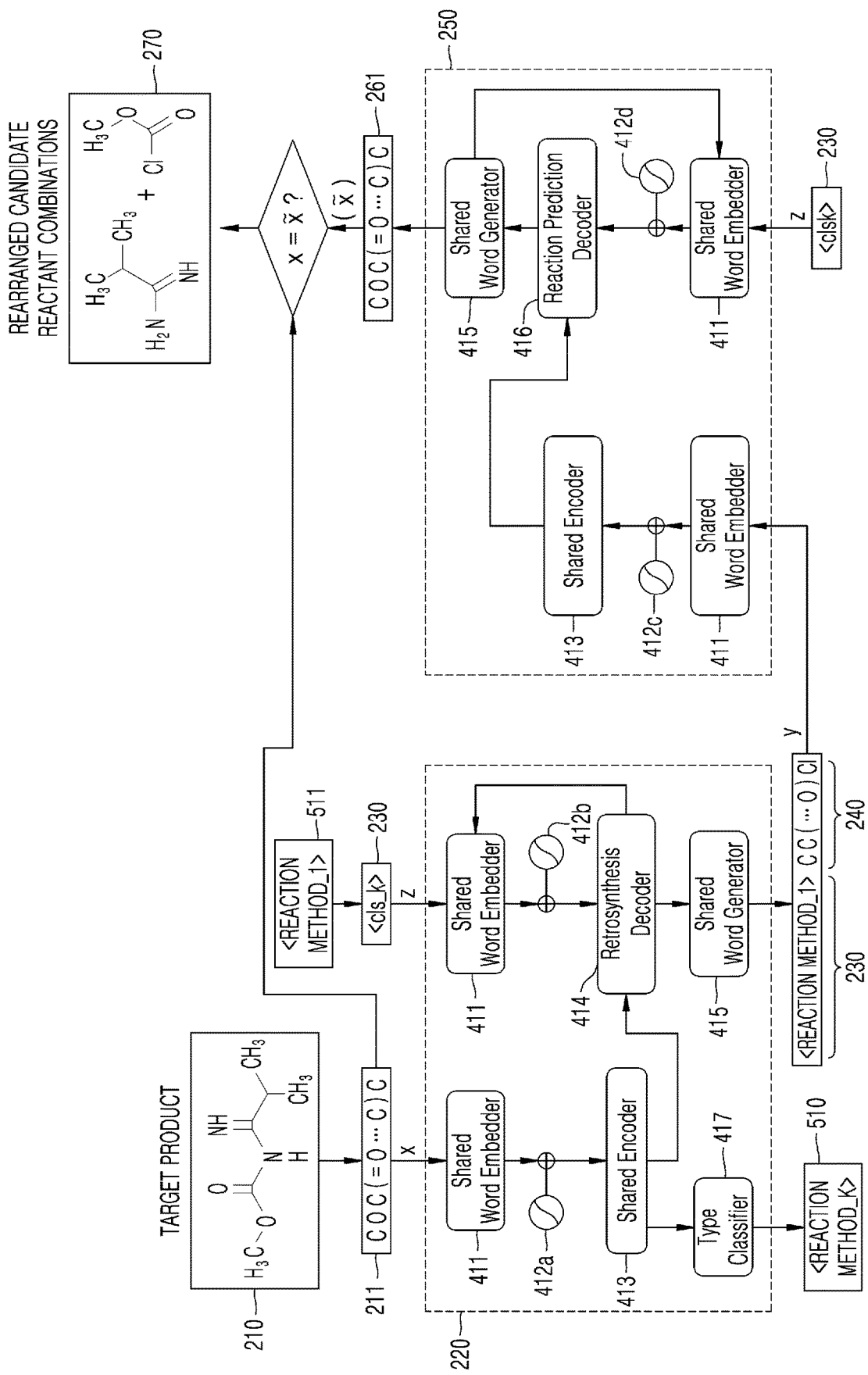
FIG. 5 is a diagram for describing a calculation performed in an retrosynthesis prediction model and a reaction prediction model, according to another example embodiment.

FIG. 5 is a diagram for describing a calculation performed in an retrosynthesis prediction model and a reaction prediction model, according to an example embodiment.

In FIG. 5, components are same as the components of FIG. 4 except, in FIG. 5, a reaction method is provided as an input value of the categorical latent variables. In FIG. 5, components that are same as the components of FIG. 4 may be referred to by the same reference numerals, and repeated descriptions will not be given.

Referring to FIG. 5, the neural network device 100 may further include a reaction method prediction model shown as type classifier 417. In FIG. 5, the type classifier 417 is illustrated as a component of an retrosynthesis prediction model 220. However, in an embodiment, the type classifier 417 may be a separate component from the retrosynthesis prediction model 220.

The reaction method prediction model show by the type classifier 417 may predict a reaction method based on information with respect to the target product 210 that is encoded. According to an example embodiment, the type classifier 417 may obtain at least one of property information, descriptor information, and structural information of the target product 210 from an encoded description of the target product 210. Also, the type classifier 417 may predict reaction methods 510 for generating the target product 210 based on at least one of the property information, the descriptor information, and the structural information of the target product 210.

The processor 110 may receive an expectation reaction method 511 from among the predicted reaction methods 510. The expectation reaction method 511 may be input into the processor 110 via a user input through the user interface 130. The expectation reaction method 511 may be used as an input value in the categorical latent variables 230.

The processor 110 may output the candidate reactant combinations 240 corresponding to the expectation reaction method 511, by decoding the encoded target product 210 and the expectation reaction method 511. For example, when the expectation reaction method 511 is a Suzuki-Miyaura method, the processor 110 may output the candidate reactant combinations 240 for generating the target product 210 by using the Suzuki-Miyaura method.

According to an example embodiment, because the expectation reaction method 511 is provided as the input value of the categorical latent variables 230, the optimum candidate reactant combinations 240 may be output in an environment in which the use of a reagent is restricted.

Figure 6:
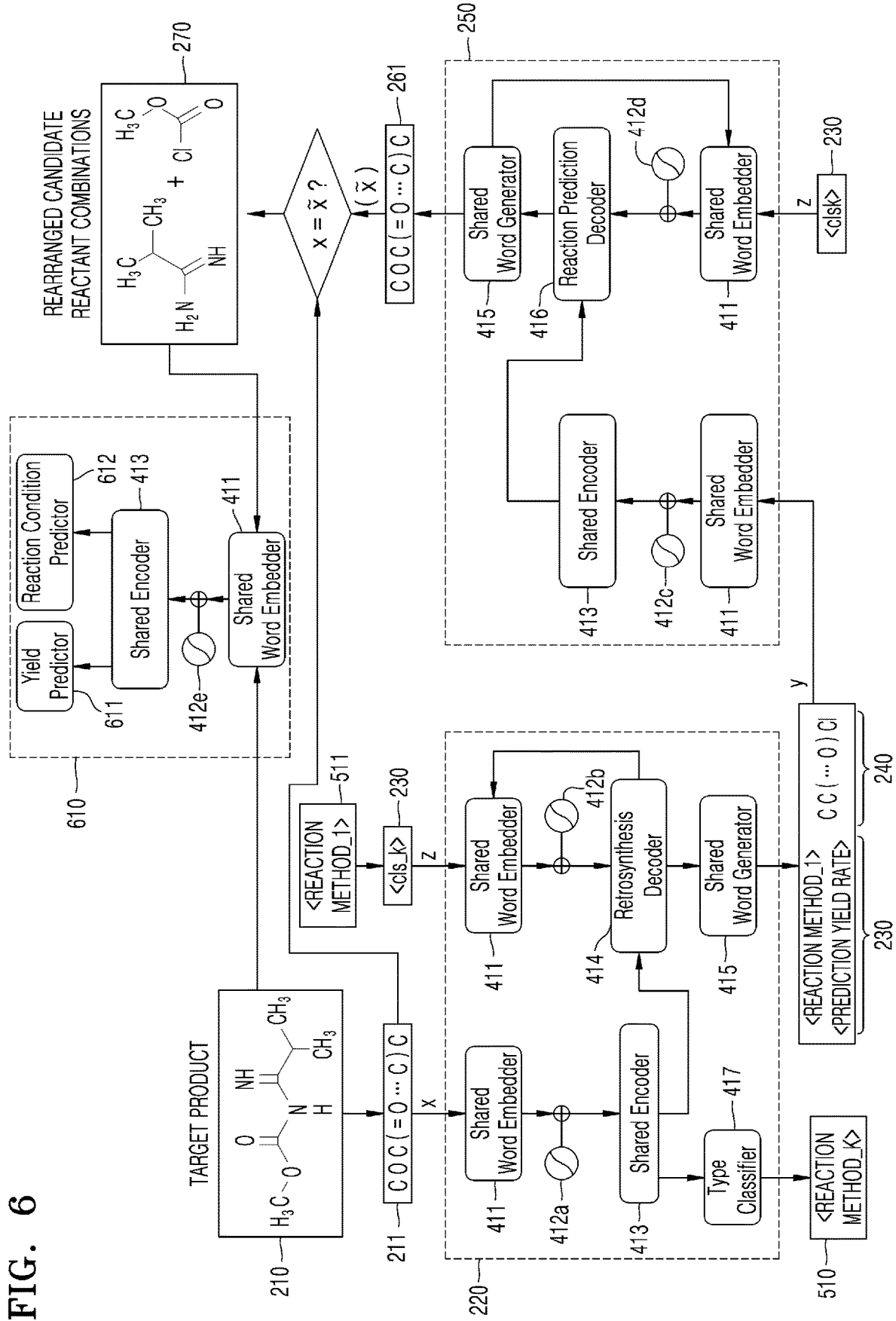
FIG. 6 is a diagram for describing a calculation performed in an retrosynthesis prediction model and a reaction prediction model, according to another example embodiment.

FIG. 6 is a diagram for describing a calculation performed in an retrosynthesis prediction model and a reaction prediction model, according to an example embodiment.

In FIG. 6, components are same as the components of FIG. 5 except, in FIG. 6, a yield rate according to an experimental condition is used when the categorical latent variables 230 are learned. In FIG. 6, components that are same as the components of FIG. 5 may be referred to by the same reference numerals, and repeated descriptions will not be given.

Referring to FIG. 6, the neural network device 100 may further include a yield rate prediction model 610. In FIG. 6, the yield rate prediction model 610 is illustrated as a separate component from the retrosynthesis prediction model 220. However, in an embodiment, the yield rate prediction model 610 may be a component of the retrosynthesis prediction model 220.

The yield rate prediction model 610 may be realized as a transformer model. The yield rate prediction model 610 may be trained via a test data set and may output an expectation yield rate of the target product 210 based on an experimental condition.

The yield rate prediction model 610 may include a word embedder 411, a fifth position encoder 412e, a yield rate prediction encoder 413, a yield rate predictor 611, and an experimental condition predictor 612. The yield rate prediction model 610 may share the word embedder 411 with the retrosynthesis prediction model 220 and the reaction prediction model 250. Also, the yield rate prediction model 610 may share the encoders with the retrosynthesis prediction model 220 and the reaction prediction model 250. The yield rate predictor 611 and the experimental condition predictor 612 may perform the same function as the decoder included in the retrosynthesis prediction model 220 and the reaction prediction model 250.

The experimental condition predictor 612 may predict experimental conditions of the rearranged candidate reactant combinations 270 for generating the target product 210. Also, when an experiment is performed under an experimental condition predicted by the experimental condition predictor 612, the yield rate predictor 611 may predict a prediction yield rate of the target product 210.

The prediction yield rate of the target product 210, predicted by the yield rate predictor 611, may be used to learn the categorical latent variables 230. The processor 110 may output the prediction yield rate of the target product 210 through a predetermined display device. Accordingly, a user may select the optimum candidate reactant combinations 240 by taking into account the prediction yield rate.

Figure 7:
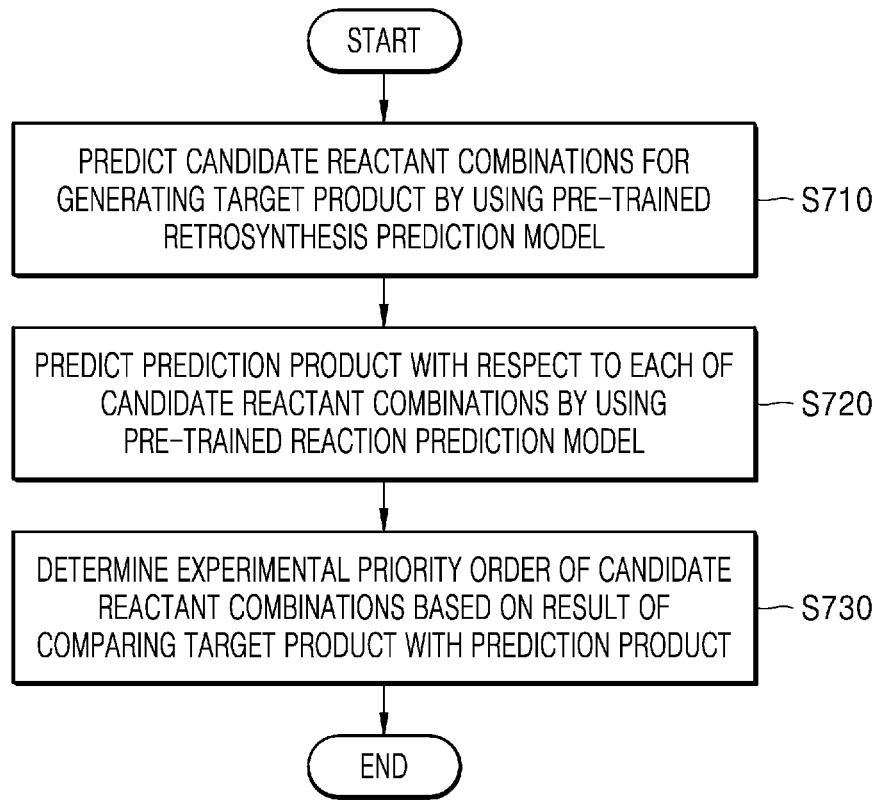
FIG. 7 is a flowchart of an operating method of a neural network device, according to an example embodiment.

FIG. 7 is a flowchart of an operating method of the neural network device 100, according to an example embodiment.

Referring to FIG. 7, in operation S710, the processor 110 may predict the candidate reactant combinations 240 for generating the target product 210 by using the retrosynthesis prediction model 220 that is pre-trained.

When information with respect to the target product 210 is received by processor 110, the processor 110 may predict the categorical latent variables 230 including a plurality of classes, based on the information with respect to the target product 210. Also, the processor 110 may autoregressively predict the candidate reactant combinations 240 based on the categorical latent variables 230.

When the information with respect to the target product 210 is x, the categorical latent variables 230 are z, and the candidate reactant combinations 240 are y, the categorical latent variables 230 and the candidate reactant combinations 240 based on an input of the target product 210 may be predicted by a likelihood P(z, y|x). The processor 110 may predict the categorical latent variables 230 and the candidate reactant combinations 240 based on a value of the likelihood P(z, y|x).

In operation S720, the processor 110 may predict the prediction product 260 with respect to each of the candidate reactant combinations 240 by using the reaction prediction model 250 that is pre-trained.

The processor 110 may obtain information with respect to the prediction product 260 based on the categorical latent variables 230 and the candidate reactant combinations 240.

In operation S730, the processor 110 may determine an experimental priority order of the candidate reactant combinations 240 based on a result of comparing the target product 210 with the prediction product 260.

The processor 110 may determine the experimental priority order of the candidate reactant combinations 240 based on whether or not the target product 210 and the prediction product 260 correspond to each other.

When the prediction product 260 is x̃ (x-tilde), a probability of the correspondence between the target product 210 and the prediction product 260 based on the categorical latent variables 230 and the input of the candidate reactant combinations 240 may be determined by a P(x̃=x|z,y) likelihood. The processor 110 may determine the experimental priority order of the candidate reactant combinations 240 according to an order in which a value of the likelihood P(x̃=x|z,y). P(z,y|x) is increased.

Figure 8:
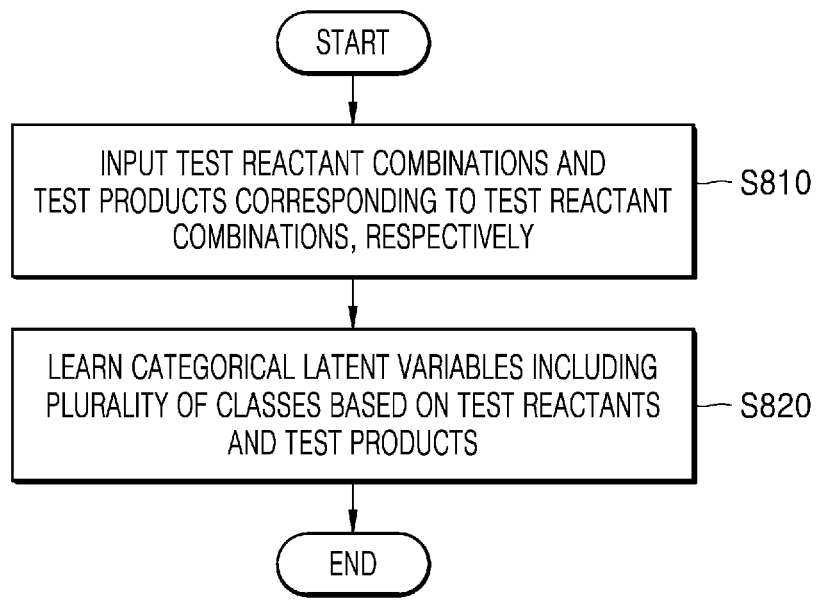
FIG. 8 is a flowchart of a learning method of an retrosynthesis prediction model and a reaction prediction model, according to an example embodiment.

FIG. 8 is a flowchart of a learning method of an retrosynthesis prediction model and a reaction prediction model, according to an embodiment.

Referring to FIG. 8, in operation S810, the processor 110 may receive test reactant combinations and test products corresponding to the test reactant combinations, respectively.

According to an example embodiment, the processor 110 may further receive a prediction yield rate of the test products according to an experimental condition and a reaction method of each of the test reactant combinations.

In operation S820, the processor 110 may learn the categorical latent variables 230 including a plurality of classes based on the test reactant combinations and the test products.

According to an example embodiment, the processor 110 may learn the categorical latent variables 230 further based on a prediction yield rate provided by the yield rate prediction model that is pre-trained.

The processor 110 may learn a conditional probability distribution of the categorical latent variables 230 with respect to an input of each of the test products.

According to an example embodiment, when information with respect to the test products is $x_{ts}$ and information with respect to the test reactants is $y_{ts}$, the processor 110 may set the categorical latent variables 230 such that a cross-entropy loss of a likelihood $P(z,y_{ts}|x_{ts})$ of the retrosynthesis prediction model 220 and a likelihood $P(x_{ts}|y_{ts},z)$ of the reaction prediction model 250 is minimized as shown in Equation 1.

$$\mathcal{L}(x_{ts}, y_{ts}) = -\sum_{z=1}^{K}(\log p(z, y_{ts}|x_{ts}) + \log p(x_{ts}|y_{ts}, z)) \quad \text{[Equation 1]}$$

For example, the processor 110 may learn the categorical latent variables 230 by using an expectation-maximization algorithm (hard EM).

When a parameter of a current model is θ, the processor 110 may repeatedly perform an operation of estimating the categorical latent variables 230 for minimizing the cross-entropy loss L, shown in Equation 2 below, and an operation of updating the parameter correspondingly to input variables, shown in Equation 3 below. When the processor 110 repeatedly updates the model, the optimum categorical latent variables 230 may be derived.

$$z^n = \mathrm{argmin}_z \mathcal{L}_h(x_{ts}^n, y_{ts}^n, z^n; \theta) \quad \text{[Equation 2]}$$

$$\theta' = \mathrm{argmin}_\theta \mathcal{L}_h(x_{ts}^n, y_{ts}^n, z^n; \theta) \quad \text{[Equation 3]}$$

In Equations 2 and 3, $L_h$ denotes that the processor 110 uses the hard EM, and in Equation 3, θ' denotes the updated parameter.

Figure 9:
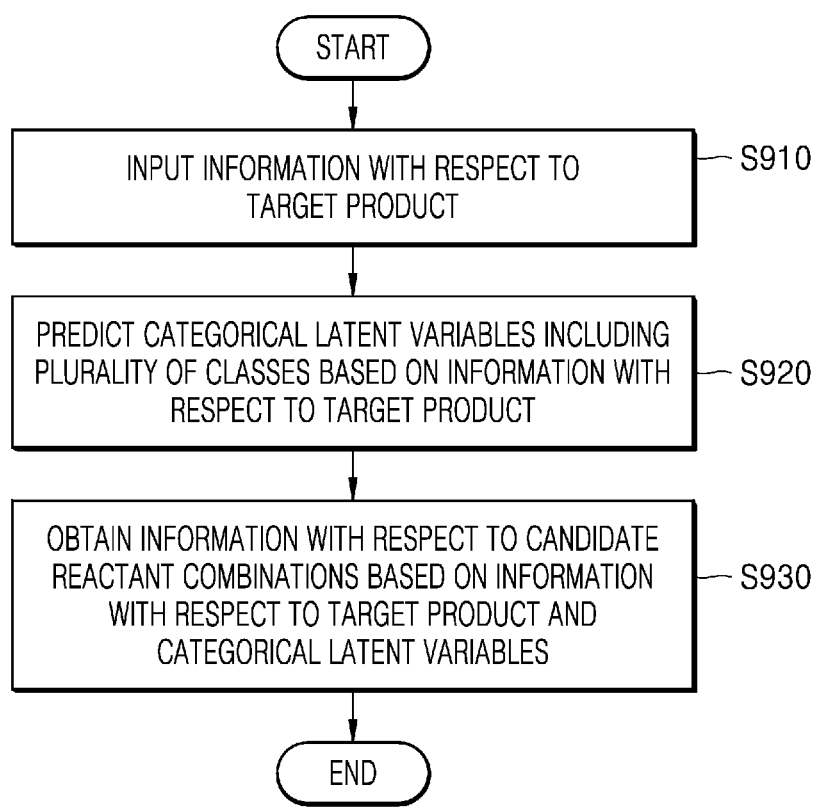
FIG. 9 is a flowchart of an operating method of an retrosynthesis prediction model, according to an example embodiment.

FIG. 9 is a flowchart of an operating method of an retrosynthesis prediction model, according to an example embodiment.

Referring to FIG. 9, in operation S910, the processor 110 may receive information with respect to the target product 210.

The processor 110 may receive a chemical structure of the target product 210 as a string type. For example, the processor 110 may receive the chemical structure of the target product 210, as a SMILES code, a SMARTS code, or an InChi code.

In operation S920, the processor 110 may predict the categorical latent variables 230 including the plurality of classes.

The processor 110 may drive the retrosynthesis prediction model 220 to predict the categorical latent variables 230 as an initial token. According to an example embodiment, the expectation reaction method 511 of the target product 210 may be provided as an input value of the categorical latent variables 230. When the expectation reaction method 511 is provided as the input value of the categorical latent variables 230, the optimum candidate reactant combinations 240 may be output in an environment in which the use of a reagent is restricted.

In operation S930, the processor 110 may obtain information with respect to the candidate reactant combinations 240 based on the information with respect to the target product 210 and the categorical latent variables 230.

The processor 110 may autoregressively predict the tokens with respect to the candidate reactant combinations 240 based on the information with respect to the target product 210 and the predicted categorical latent variables 230. Likelihoods of the categorical latent variables 230 and the candidate reactant combinations 240 based on an input of the target product 210 may be determined by Equation 4 below.

$$P(z, y|x) = P(z|x)P(y|x, z) = P(z|x)\prod_{x=1}^{T} P(y_t|x, z, y_{ct}) \quad \text{[Equation 4]}$$

In Equation 4, T denotes a length of a token sequence, and $y_{<t}$ denotes a target token before $y_t$.

The processor 110 may output the candidate reactant combinations 240 maximizing both a likelihood for each class with respect to the input of the target product 210 and a likelihood of an retrosynthesis prediction result with respect to the input of the target product 210 and the categorical latent variables 230.

According to an example embodiment, the processor 110 may select a predetermined number of final candidate reactant combinations based on the likelihood for each class and the likelihood of the retrosynthesis prediction result. For example, the processor 110 may select a predetermined number of sets according to an order in which the likelihoods of the categorical latent variables 230 and the candidate reactant combinations 240 based on the input of the target product 210 are increased. The set may include a pair of the categorical latent variables 230 and the final candidate reactant combinations 240. The pair of the categorical latent variables 230 and the final candidate reactant combinations 240 may be input into the reaction prediction model 250 and used to calculate the prediction product 260.

Figure 10:
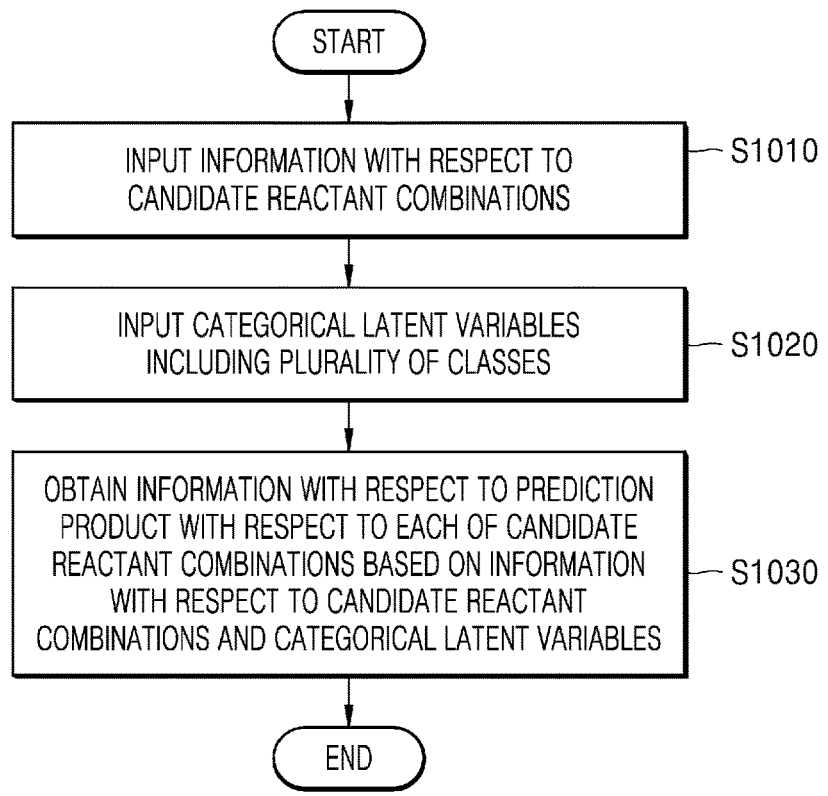
FIG. 10 is a flowchart of an operating method of a reaction prediction model, according to an example embodiment.

FIG. 10 is a flowchart of an operating method of a reaction prediction model, according to an example embodiment.

Referring to FIG. 10, in operation S1010, the processor 110 may receive information with respect to the candidate reactant combinations 240.

The processor 110 may receive a structure of the candidate reactant combinations 240 as a string type. Here, the string type of the candidate reactant combinations 240 may be the same as the string type of the target product 210. For example, when the string type of the target product 210 is a SMILES code, the string type of the candidate reactant combinations 240 may also be a SMILES code.

In operation S1020, the processor 110 may receive the categorical latent variables 230 including a plurality of classes.

In other words, the processor 110 may receive a pair of the categorical latent variables 230 and the final candidate reactant combinations 240.

In operation S1030, the processor 110 may obtain information with respect to the prediction product 260 with respect to each of the candidate reactant combinations 240 based on the information with respect to the candidate reactant combinations 240 and the categorical latent variables 230.

The processor 110 may generate a token of the prediction product 260 based on a likelihood $P(x|z,y)$. The prediction product 260 may be used for verification of the retrosynthesis prediction model 220.

Figure 11:
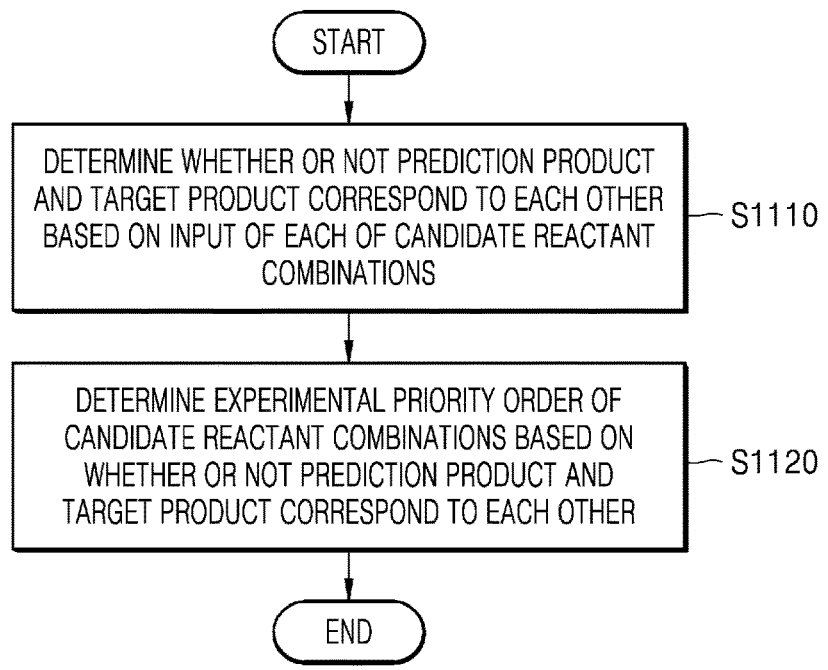
FIG. 11 is a flowchart of a method of determining an experimental priority order of candidate reactant combinations, according to an example embodiment.

FIG. 11 is a flowchart of a method of determining an experimental priority order of the candidate reactant combinations 240, according to an example embodiment.

Referring to FIG. 11, in operation S1110, the processor 110 may determine whether or not the prediction product 260 and the target product 210 correspond to each other, based on the input of each of the candidate reactant combinations 240.

The processor 110 may determine whether or not the target product 210 and the prediction product 260 correspond to each other based on the input of the categorical latent variables 230 and the candidate reactant combinations 240, based on a likelihood $P(\tilde{x}=x|z,y)$ In operation S1120, the processor 110 may determine an experimental priority order of the candidate reactant combinations 240 based on a result of whether or not the prediction product 260 and the target product 210 correspond to each other.

The processor 110 may determine the experimental priority order of the candidate reactant combinations 240 according to an order in which a value of a likelihood $P(\tilde{x}=x|z,y)$. $P(z,y|x)$ is increased.

The example embodiments described above may be written as a program executable in a computer and may be realized by a general-purpose digital computer for executing the program by using a computer-readable recording medium. Also, data structures used in the embodiments may be written in a computer-readable recording medium through various methods. The computer-readable recording medium may include a storage medium, such as a magnetic storage medium (for example, a ROM, a floppy disk, a hard disk, etc.) and an optical reading medium (for example, a CD ROM, a DVD, etc.).

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A method of synthesizing a target product using a neural network, the method comprising:
predicting candidate reactant combinations for generating the target product based on a pre-trained retrosynthesis prediction model using categorical latent variables;
predicting a prediction product with respect to each of the candidate reactant combinations based on a pre-trained reaction prediction model using the categorical latent variables shared with the pre-trained retrosynthesis prediction model;
performing a comparison operation to compare a string type representation of the target product with a string type representation of the prediction product;
determining an experimental priority order of the candidate reactant combinations based on a result of the comparison operation; and
experimentally synthesizing the target product based on the experimental priority order of the candidate reactant combinations,
wherein the candidate reactant combinations derived through the pre-trained retrosynthesis prediction model are verified through the pre-trained reaction prediction model to prevent a candidate reactant combination inconsistent with a formula grammar to be output for predicting the prediction product.

2. The method of claim 1, further comprising,
receiving test reactant combinations and test products corresponding to the test reactant combinations, and
learning, using the pre-trained retrosynthesis prediction model and the pre-trained reaction prediction model, the categorical latent variables including a plurality of classes based on the test reactant combinations and the test products.

3. The method of claim 2, wherein the learning of the categorical latent variables includes learning a conditional probability distribution of the categorical latent variables corresponding to an input representing each of the test products.

4. The method of claim 2, wherein the learning of the categorical latent variables includes learning the categorical latent variables based on a prediction yield rate provided by a pre-trained yield rate prediction model.

5. The method of claim 2, wherein the predicting of the candidate reactant combinations and the predicting of the prediction product is based on the learned categorical latent variables.

6. The method of claim 1, wherein the predicting of the candidate reactant combinations comprises:
receiving information corresponding to the target product;
predicting categorical latent variables including a plurality of classes based on the information corresponding to the target product; and
obtaining information corresponding to the candidate reactant combinations based on the information corresponding to the target product and the categorical latent variables.

7. The method of claim 6, wherein the obtaining of the information corresponding to the candidate reactant combinations comprises:
calculating a likelihood for each of the plurality of classes of each of the candidate reactant combinations based on an input representing the target product;
calculating a likelihood of an retrosynthesis prediction result corresponding to the input representing to the target product and an input representing the categorical latent variables; and
selecting a predetermined number of final candidate reactant combinations based on the likelihood for each class and the likelihood of the retrosynthesis prediction result.

8. The method of claim 6, wherein the predicting of the categorical latent variables includes providing an expectation reaction method for generating the target product as an input value of the categorical latent variables.

9. The method of claim 1, wherein the predicting of the prediction product comprises:
receiving information corresponding to the candidate reactant combinations;
receiving categorical latent variables including a plurality of classes; and
obtaining information corresponding to the prediction product with respect to each of the candidate reactant combinations, based on the information corresponding to the candidate reactant combinations and the categorical latent variables.

10. The method of claim 1, wherein the determining of the experimental priority order of the candidate reactant combinations comprises:
determining whether the prediction product and the target product correspond to each other, based on an input representing each of the candidate reactant combinations; and
determining the experimental priority order of the candidate reactant combinations based on whether the prediction product and the target product correspond to each other.

11. An apparatus including a neural network, the apparatus comprising:
a memory storing at least one program; and
a processor configured to execute the at least one program to:
predict candidate reactant combinations for generating a target product based on a pre-trained retrosynthesis prediction model using categorical latent variables;
predict a prediction product with respect to each of the candidate reactant combinations based on a pre-trained reaction prediction model using the categorical latent variables shared with the pre-trained retrosynthesis prediction model;
perform a comparison operation to compare a string type representation of the target product with a string type representation of the prediction product;
determine an experimental priority order of the candidate reactant combinations based on a result of the comparison operation; and
experimentally synthesize the target product based on the experimental priority order of the candidate reactant combinations,
wherein the candidate reactant combinations derived through the pre-trained retrosynthesis prediction model are verified through the pre-trained reaction prediction model to prevent a candidate reactant combination inconsistent with a formula grammar to be output for predicting the prediction product.

12. The apparatus of claim 11, wherein the processor is further configured to learn, using the pre-trained retrosynthesis prediction model and the pre-trained reaction prediction model, the categorical latent variables including a plurality of classes based on test reactant combinations and test products corresponding to the test reactant combinations.

13. The apparatus of claim 12, wherein the pre-trained retrosynthesis prediction model and the pre-trained reaction prediction model learn a conditional probability distribution of the categorical latent variables with respect to an input representing each of the test products.

14. The apparatus of claim 12, wherein the pre-trained retrosynthesis prediction model and the pre-trained reaction prediction model learn the categorical latent variables based on a prediction yield rate provided by a pre-trained yield rate prediction model.

15. The apparatus of claim 12, where the processor is further configured to predict the candidate reactant combinations and the predicting of the prediction product is based on the learned categorical latent variables.

16. The apparatus of claim 11, wherein the processor is further configured to execute the at least one program to:
receive information corresponding to the target product;
predict categorical latent variables including a plurality of classes based on the information corresponding to the target product; and
obtain information corresponding to the candidate reactant combinations based on the information corresponding to the target product and the categorical latent variables.

17. The apparatus of claim 16, wherein the processor is further configured to execute the at least one program to:
calculate a likelihood for each of the plurality of classes of each of the candidate reactant combinations based on an input representing the target product;
calculate a likelihood of an retrosynthesis prediction result with respect to the input representing the target product and an input representing the categorical latent variables; and
select a predetermined number of final candidate reactant combinations based on the likelihood for each class and the likelihood of the retrosynthesis prediction result.

18. The apparatus of claim 16, wherein an expectation reaction method for generating the target product is provided as an input value of the categorical latent variables.

19. The apparatus of claim 11, wherein the processor is further configured to execute the at least one program to:
   receive information corresponding to the candidate reactant combinations;
   receive categorical latent variables including a plurality of classes; and
   obtain information corresponding to the prediction product corresponding to each of the candidate reactant combinations, based on the information corresponding to the candidate reactant combinations and the categorical latent variables.

20. The apparatus of claim 11, wherein the processor is further configured to execute the at least one program to:
   determine whether the prediction product and the target product correspond to each other, based on an input representing each of the candidate reactant combinations; and
   determine the experimental priority order of the candidate reactant combinations based on whether the prediction product and the target product correspond to each other.

\* \* \* \* \*